United States Patent
Beretta et al.

[11] Patent Number: 5,971,322
[45] Date of Patent: Oct. 26, 1999

[54] PROPELLER PROPULSION UNIT FOR AIRCRAFTS IN GENERAL

[75] Inventors: Mario Beretta, Sirtori; Paolo Ballocchi, Monticello; Gianni Fumagalli, Ronco Briantino, all of Italy

[73] Assignee: Tecom S.R.L., Vigano, Italy

[21] Appl. No.: 08/753,057

[22] Filed: Nov. 19, 1996

[30] Foreign Application Priority Data

Nov. 30, 1995 [IT] Italy .................................. MI95A2519

[51] Int. Cl.⁶ ........................... B64D 35/00; B64D 27/00
[52] U.S. Cl. ........................... 244/65; 244/57 R; 244/62; 244/55
[58] Field of Search .................... 244/53 R, 54, 244/55, 56, 65, 66, 62

[56] References Cited

U.S. PATENT DOCUMENTS

| | | |
|---|---|---|
| 1,084,023 | 1/1914 | Matteson . |
| 1,485,788 | 3/1924 | Lawmers . |
| 2,071,513 | 2/1937 | Everts . |
| 2,497,590 | 2/1950 | Drill . |
| 2,954,943 | 10/1960 | De Lagabbe . |
| 3,312,286 | 4/1967 | Irgens . |
| 3,917,195 | 11/1975 | Oguri ........................................ 244/66 |
| 4,546,938 | 10/1985 | Kolecki ..................................... 244/66 |
| 4,662,584 | 5/1987 | Eickmann ................................. 244/54 |

FOREIGN PATENT DOCUMENTS

| | | |
|---|---|---|
| 918 819 | 3/1947 | France . |
| 968 710 | 12/1950 | France . |
| 9 204 986 | 7/1992 | Germany . |
| 462 037 | of 0000 | United Kingdom . |

*Primary Examiner*—William A. Cuchlinski, Jr.
*Assistant Examiner*—Yonel Beaulieu
*Attorney, Agent, or Firm*—Guido Modiano; Albert Josif

[57] ABSTRACT

A propeller propulsion unit for aircrafts in general including a rotation shaft driven by a motor, the unit including a single-blade propeller and a counterweight that are connected to the shaft, the counterweight being arranged in a substantially diametrical position with respect to the single blade in order to balance the moment generated by centrifugal force and being variably offset with respect to the axis of the blade in order to balance the moment generated by the traction force of the single-blade propeller.

8 Claims, 3 Drawing Sheets

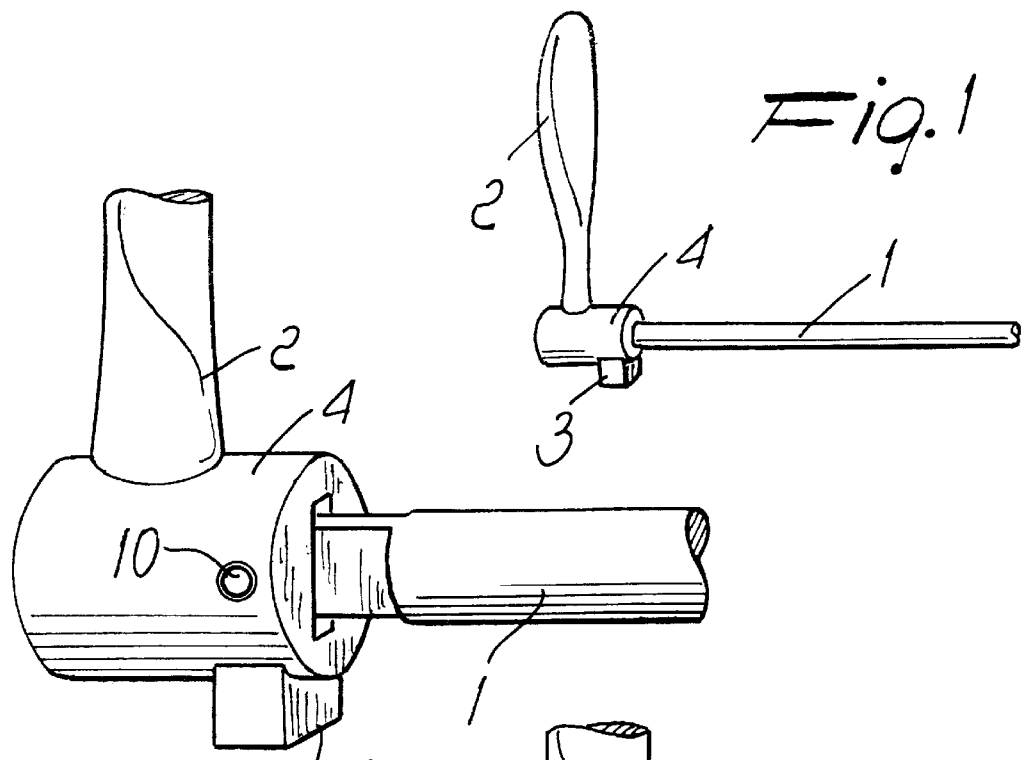
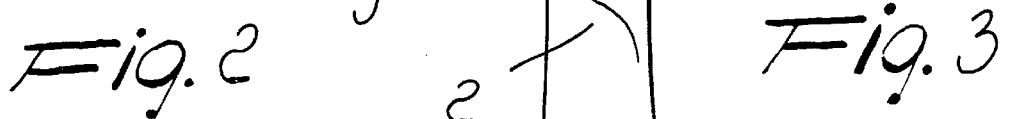
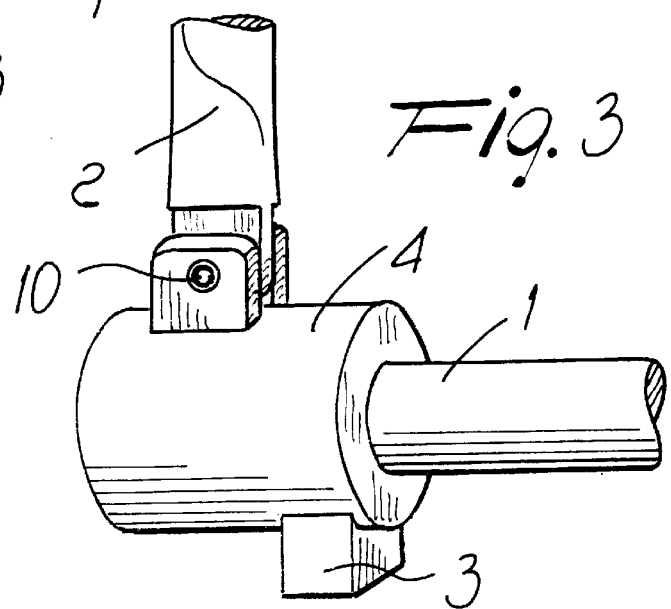
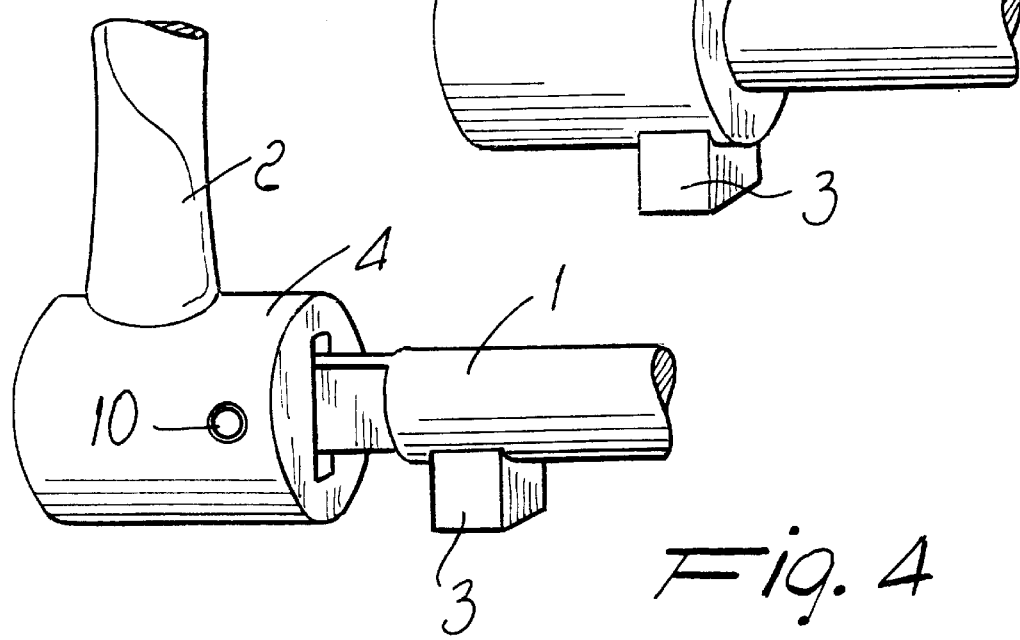

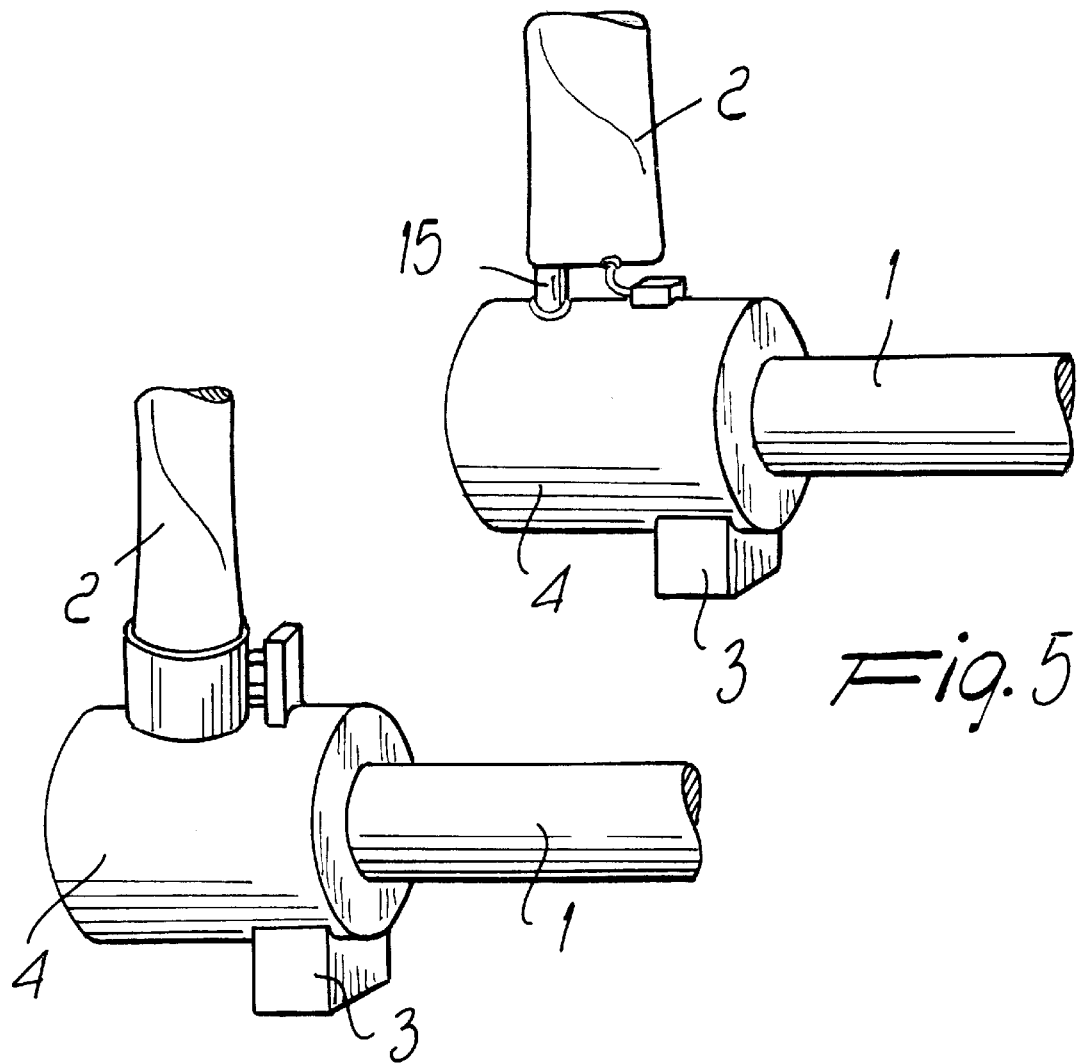
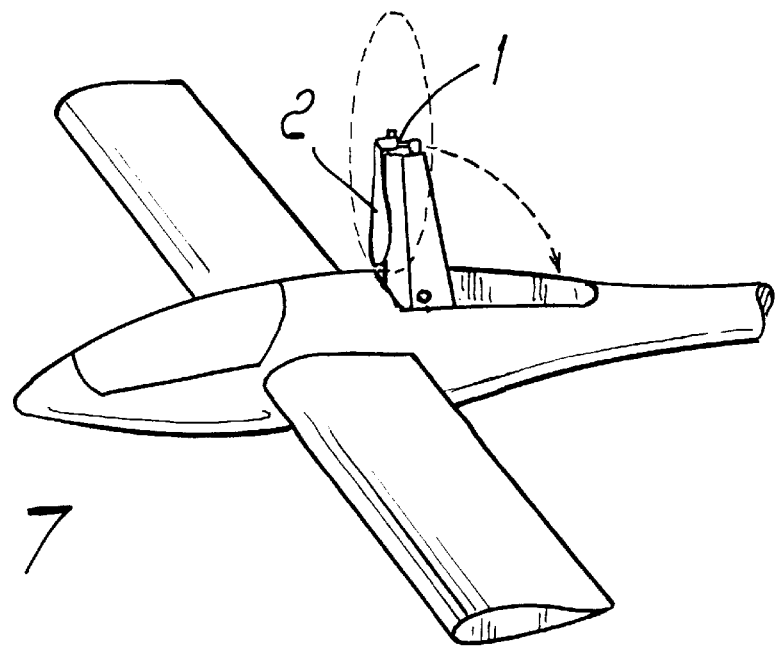

PROPELLER PROPULSION UNIT FOR AIRCRAFTS IN GENERAL

BACKGROUND OF THE INVENTION

The present invention relates to a propeller propulsion unit for aircrafts in general.

Aircrafts in general that do not use jet propulsion systems are conventionally provided with one or more propellers that convert the power supplied by the motor into traction.

The propellers normally used are of various kinds, such as for example pusher or pulling propellers, with fixed or variable pitch, and ducted; these propellers are furthermore constituted by two or more blades that are arranged so as to balance, on the propeller axis, both the action of the centrifugal force, produced by the rotation of said propeller, and the moments caused by the aerodynamic forces generated by the relative speed of the blade with respect to the air.

Propellers having a single blade are used exclusively in the field of flying model aircrafts, i.e., with powerplants having extremely small power ratings.

The use of a single-blade propeller would certainly be useful in many applications in aircrafts, since it would be possible to improve the efficiency of the propeller and have considerable constructive simplicity; however, this type of use has so far been unfeasible, since all the problems that arise from compensating the radially-directed forces, inertial forces, and aerodynamic forces, with their corresponding moments, generated by the relative speed of the blade with respect to the air, have not been solved. These factors, which also vary as the relative speed of the blade with respect to the air varies, would produce troublesome stresses and vibrations that might lead to fatigue failure, especially if considerable masses are involved.

Accordingly, the use of a propulsion unit with single-blade propeller has never had a practical follow-up.

SUMMARY OF THE INVENTION

A principal aim of the invention is to solve the above problem by providing a propeller propulsion unit for aircrafts in general that allows to use a single-blade propeller without having imbalances of the forces involved that might produce vibrations or stresses.

Within the scope of this aim, a particular object of the invention is to provide a propulsion unit in which it is possible to automatically compensate for any imbalances in forces, working at all times with a system that is balanced and as such is never in abnormal operating conditions.

Another object of the present invention is to provide a propeller propulsion unit for aircrafts in general that is capable of giving the greatest assurances of reliability and safety in use thanks to its particular constructive characteristics.

Another object of the present invention is to provide a propeller propulsion unit for aircrafts in general that can be easily obtained starting from commonly commercially available elements and materials and is furthermore competitive from a merely economical point of view.

This aim, these objects, and others that will become apparent hereinafter are achieved by a propeller propulsion unit for aircrafts in general, according to the invention, comprising a rotation shaft driven by a motor, characterized in that it comprises a single blade that is connected to said shaft and a counterweight that is arranged in a diametrical position with respect to said blade in order to balance the moment generated by centrifugal force and is offset with respect to the axis of said blade in order to balance the moment generated by the traction force of the single-blade propeller.

BRIEF DESCRIPTION OF THE DRAWINGS

Further characteristics and advantages of the invention will become apparent from the following detailed description of some preferred but not exclusive embodiments of a propeller propulsion unit for aircrafts in general, illustrated only by way of non-limitative example in the accompanying drawings, wherein:

FIG. 1 is a schematic view of a propulsion unit with a single-blade propeller and an offset counterweight;

FIG. 2 is a view of a propulsion unit in which the blade, the hub, and the counterweight can oscillate with respect to the shaft;

FIG. 3 is a schematic view of a propulsion unit in which the blade is pivoted with respect to the hub;

FIG. 4 is a schematic view of a propulsion unit in which the hub is pivoted with respect to the shaft and the counterweight is fixed on the shaft;

FIG. 5 is a schematic view of a propulsion unit in which the blade is rotatable about an axis that is substantially parallel to its own axis;

FIG. 6 is a view of a propulsion unit in which the blade is rotatable about its own axis;

FIG. 7 is a schematic view of the propulsion unit according to the invention, applied to a powered glider;

DESCRIPTION OF THE PREFERRED EMBODIMENTS

Figure 10:
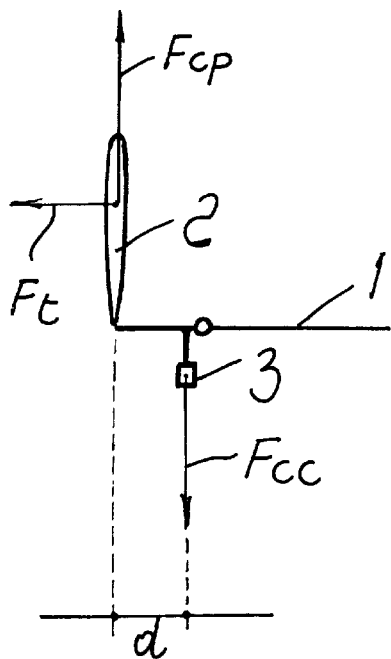
FIGS. 10 and 11 are schematic views of the possibility of varying the axial offset, in which the oscillations have been exaggerated to clarify the concept.

With reference to the above figures, the propeller propulsion unit for aircrafts in general, according to the invention, comprises a rotation shaft 1 driven by a motor that is not shown in the drawings.

The single blade 2 and a counterweight 3 are connected to the shaft 1.

In order to solve the problem of the imbalance caused by the moment generated by the traction force, the center of gravity of the counterweight is axially offset with respect to the center-of-gravity axis of the blade, so as to generate a new moment, produced indeed by the centrifugal forces, that is capable of balancing the previous moment.

Figure 8:
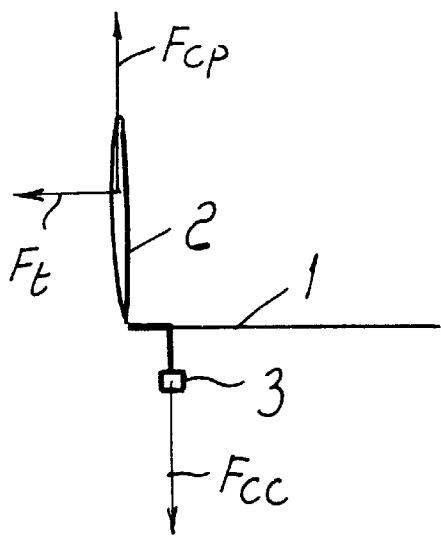
FIGS. 8 and 9 are schematic views of the offset of the counterweight with respect to the axis of the blade.
Figure 9:
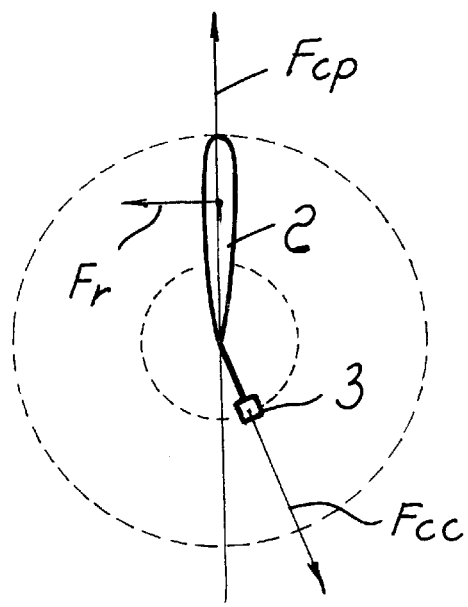

In order to better clarify the concept, reference should be made to the diagrams of FIGS. 8 and 9, in which Fcp designates the centrifugal force on the blade, Fcc designates the centrifugal force on the counterweight, Ft designates the traction force, and Fr designates the resisting force of the blade.

As shown by the accompanying drawings, in order to compensate for the moment produced by the traction force Ft it is necessary to create a moment that balances it, and this is achieved by axially offsetting the counterweight 3, as shown in FIG. 8, along the axis of the shaft 1, whereas in order to compensate for the resisting force of the blade, as shown in FIG. 9, an axial offset is produced through an angular displacement of the counterweight 3 on the plane that it traces by rotating; in this manner, the counterweight is displaced, albeit slightly, from a position that is exactly diametrical with respect to the blade.

With reference to the drawings, FIG. 1 illustrates a solution with a counterweight 3 having a fixed axial offset, said solution being shown conceptually in the diagrams 8 and 9.

This solution allows to solve the problem of the imbalance of the forces involved in constant flying conditions.

However, even if operation occurs at a constant rotation rate, flying conditions are variable, and in particular the traction coefficient, and therefore the value of said traction force, can vary considerably.

This variability produces an imbalance, since the balancing moment generated by the axial offset is fixed and therefore does not take into account the change in the traction force.

In order to solve this problem, the proposed solution provides for a change in the axial offset, so as to balance the single-blade system.

Figure 11:
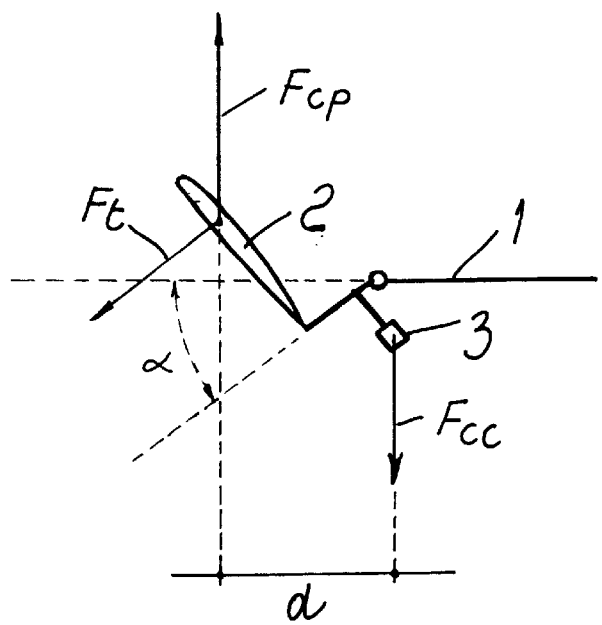

As shown schematically in the diagrams of FIGS. 10 and 11, wherein d designates the axial offset, one result of the present invention is pointed out, namely the utilization, as the traction force Ft varies, of a change in the axial offset d, which is achieved by allowing the single-blade propeller to oscillate with respect to the shaft by means of a pivot that allows to form an angle , even a small one. As shown schematically in FIG. 11, it is thus evident that as the traction force Ft varies, the axial offset d also varies and the resulting moment of equilibrium is changed accordingly.

In practice, therefore, a device is provided which interconnects the blade, the shaft, the hub, and the counterweight and is capable of creating, by utilizing centrifugal forces, another opposite moment that can vary as the traction coefficient varies.

In order to achieve and control the movement produced by the centrifugal forces, the distance, measured along the rotation axis, between the center of gravity of the blade and the center of gravity of the counterweight has therefore been changed, producing a change in the distance that is a function of the imbalance, in order to achieve the intended substantial balance.

As shown in FIG. 2, the distance is changed by means of a pivot 10 that allows the hub 4, the blade 2, and the counterweight 3, which are rigidly provided on the hub, to rotate about an axis that is perpendicular to the shaft 1.

From a conceptual design point of view, the involved centrifugal forces, which are extremely large, are discharged onto the hub 4, whereas the more modest torque transmitted from the shaft to the propeller is discharged onto the pivot 10.

A solution is thus proposed that is capable of meeting the requirements of adapting the axial offset without having excessive constructive complexities.

In the embodiment of FIG. 3, the hub 4 and the counterweight 3 are rigidly coupled to the shaft 1, whilst the blade 2 is pivoted to the hub 4, thus obtaining a conceptual diagram that is similar to the preceding one.

From a conceptual design point of view, the pivot 10 of the blade is subjected both to almost all the torque transmitted by the shaft to the propeller and, most of all, to the centrifugal force to which the blade is subjected.

The above-described solution therefore entails greater structural and construction problems, but it has the advantage that is optionally possible to fold the blade 2 backward when it is not being used, so as to avoid creating resistance to motion.

An intermediate solution, which is conceptually linked to the preceding ones, is shown in FIG. 4; in this solution, the counterweight 3 is arranged on the shaft 1 and the hub 4 is rigidly coupled to the blade and pivoted with respect to the shaft 1.

According to a different embodiment, the axial offset can be achieved, as shown in FIGS. 5 and 6, by displacing the single blade 2 about an axis that is substantially parallel to the axis of the blade 2 and is substantially perpendicular to the shaft 1.

This variation in the axial offset value can be achieved, as shown in FIG. 5, by rotating the blade 2 about a secondary shaft 15 that is parallel to the axis of the blade 2, and therefore it is possible to vary both the axial offset and the pitch of the blade 2 and therefore the traction of the propulsion system is changed without altering the rotation rate of the motor, thus achieving a simultaneous adaptation of the pitch of the blade 2 and a change in the extent of the axial offset between the axis of the center of gravity of the blade 2 and the center of gravity of the counterweight 3.

This solution provides considerable advantages, such as a flying condition that theoretically always provides for the maximum efficiency of the propeller, and entails constructive difficulties that are considerable with respect to those described previously.

Another embodiment, shown in FIG. 6, changes the pitch of the blade 2 and therefore Fp instead of resorting to an axial offset.

In this case, therefore, the opposite moments are canceled out whilst keeping the value of traction constant at all times.

The blade 2 in practice is rotated about its own axis, providing a solution that is certainly simple but has the limitation of providing a traction value that is theoretically always constant.

From the above description it is thus evident that the invention achieves the intended aim and objects, and in particular the fact is stressed that a single-blade propulsion unit is provided which allows to compensate for the resulting imbalances in a very simple way, thus making this type of propulsion unit particularly adapted for application to powered gliders, in which it is necessary to retract the propulsion unit once the soaring altitude has been reached.

With conventional solutions, either a fixed two-blade propeller is used, with the need to provide a recess that is twice the one of the single-blade propeller, or foldable two-blade propellers are used, which are structurally complicated and not very effective.

The invention thus conceived is susceptible of numerous modifications and variations, all of which are within the scope of the inventive concept. All the details may furthermore be replaced with other technically equivalent elements.

In practice, the materials employed, so long as they are compatible with the specific use, as well as the contingent shapes and dimensions, may be any according to the requirements.

What is claimed is:

1. A propeller propulsion unit for aircrafts in general, comprising:

a rotation shaft driven by a motor, said rotation shaft having a rotation axis;

a single-blade propeller having a longitudinal center-of-gravity axis, said single-blade propeller being connected to said shaft such that said rotation axis of said shaft and said longitudinal center-of-gravity axis of said single-blade propeller both extend in a central plane, and such that an orthngonal plane is defined which contains said longitudinal center-of-gravity axis and which extends perpendicularly to said central plane; and a single counterweight connected to said shaft, said single counterweight being provided in order to balance the moment generated by centrifugal force and being offset with respect to the longitudinal center-of-gravity axis of said single-blade propeller in order to balance the moment generated by the aerodynamic forces of said single-blade propeller, said single counterweight being positioned such that the center of graavity of the counterweight is positioned offfset with respect to said orthogonal plane to one side of said orthogonal plane, and said single counterweight being positioned such that the center of gravity of said counterweight is positioned offset with respect to said central plane to one side of said central plane, and said counterweight being the only counterweight of the unit such that no other counterweights are arranged offset with respect to said orthogonal plane and with respect to said central plane.

2. A propulsion unit according to claim 1, comprising a pivot for pivoting a hub about an axis that is perpendicular to said rotation shaft, said blade and said counterweight protruding from said hub.

3. A propeller propulsion unit for aircrafts in general, comprising:

a rotation shaft driven by a motor, said rotation shaft having a rotation axis;

a single-blade propeller having a longitudinal center-of-gravity axis, said single-blade propeller being connected to said shaft such that said rotation axis of said shaft and said longitudinal center-of-gravity axis of said singe-blade propeller both extend in a central plane, and such that an orthogonal plane is defined which contains said longitudinal center-of-gravity axis and which extends perpendicularly to said central plane; and a single counterweight connected to said shaft, said size counterweight being provided in order to balance the moment generated by centrifugal force, said single-blade propeller being movable with respect to said shaft in order to balance the moment generated by the traction force of said single-blade propeller, said single counterweight being positioned such that the center of gravity of the counterweight is positioned offset with respect to said orthogonal plane to one side of said orthogonal plane, and said single counterweight being positioned such that the center of gravity of said counterweight is positioned offset with respect to said central plane to one side of said central plane, and said counterweight being the only counterweight of the unit such that no other counterweights are arranged offset with respect to said orthogonal plane and with respect to said central plane.

4. A propulsion unit according to claim 3, comprising a hub that is rigidly coupled to said shaft and to said counterweight, said blade being pivoted to said hub about an axis that is perpendicular to the axis of said shaft.

5. A propulsion unit according to claim 3, comprising a hub that is pivoted to said shaft and is rigidly coupled to said blade, said counterweight being rigidly coupled to said shaft.

6. A propulsion unit according to claim 3, wherein said blade is rotatable about a secondary shaft that is parallel to the axis of said blade.

7. A propulsion unit according to claim 3, wherein said blade is rotatable about its own axis to vary the pitch of the single-blade propeller.

8. A propeller propulsion unit for aircrafts in general, comprising a rotation shaft driven by a motor, comprising a single-blade propeller and a counterweight that are connected to said shaft, said counterweight being provided in order to balance the moment generated by centrifugal force, said single-blade propeller being movable with respect to said shaft in order to balance the moment generated by the traction force of said single-blade propeller, the unit further comprising a hub that is pivoted to said shaft and is rigidly coupled to said blade, said counterweight being rigidly coupled to said shaft.

\* \* \* \* \*